United States Patent

[11] 3,568,025

| [72] | Inventor | Henry J. Havlicek<br>Erie, Pa. |
|---|---|---|
| [21] | Appl. No. | 848,193 |
| [22] | Filed | Aug. 7, 1969 |
| [45] | Patented | Mar. 2, 1971 |
| [73] | Assignee | General Electric Company |

| 3,401,325 | 10/1968 | Stringer | 318/302 |
|---|---|---|---|
| 3,458,790 | 7/1969 | Wilkerson | 318/293 |

Primary Examiner—Oris L. Rader
Assistant Examiner—K. L. Crosson
Attorneys—James C. Davis, Jr., Edward W. Goebel, Jr., Frank L. Neuhauser, Oscar B. Waddell and Joseph B. Forman

[54] PROTECTIVE CIRCUIT FOR CONTROLLED RECTIFIERS OF A MOTOR CONTROL SYSTEM
6 Claims, 4 Drawing Figs.

| [52] | U.S. Cl. | 318/258,<br>318/332, 318/341, 318/492 |
|---|---|---|
| [51] | Int. Cl. | H02p 5/00 |
| [50] | Field of Search | 318/258,<br>269, 332, 341, 345, 302 |

[56] References Cited
UNITED STATES PATENTS

| 3,260,894 | 7/1966 | Denault | 317/16 |
|---|---|---|---|
| 3,372,288 | 3/1968 | Wigington | 317/11 |

ABSTRACT: A motor control system which normally, repeatedly operates in the regenerative mode includes a protective circuit which reduces the failure of controlled rectifiers in a power amplifier of this system as the system enters into a coasting mode of operation. The protective circuit retards the occurrence of firing signals for these controlled rectifiers, rather than eliminate the firing signals, when the current flow through these controlled rectifiers must be rapidly terminated. The firing signals are positively prevented from being eliminated until the current flow is below a preselected low level. After the retarded occurrence of firing signals causes the current flow to be reduced to below this level, the protective circuit automatically eliminates the firing signals and prevents the further conduction through the controlled rectifiers until the drive system is intentionally restarted.

INVENTOR.
HENRY J. HAVLICEK
BY Edward W. Goebel
HIS ATTORNEY

PROTECTIVE CIRCUIT FOR CONTROLLED RECTIFIERS OF A MOTOR CONTROL SYSTEM

BACKGROUND OF THE INVENTION

This invention relates to motor control systems, and more particularly, to reversing motor control systems using phase controlled power amplifiers for controlling the flow of electrical energy between an alternating-current AC source and a drive motor.

While not limited to any particular application, this invention is particularly useful in motor control systems requiring direct-current DC motors to operate in a motoring mode in one direction of rotation, delivering mechanical energy to a load, and to operate in a regenerative mode in the other direction of rotation, delivering electrical energy to the power source. For example, in a crane hoist drive system a drive motor is operated in its motoring mode as it controllably raises a load and is normally operated in its regenerative mode with its direction of rotation reversed to control the speed of the load as the load is lowered.

Motor control systems of the type described above now often use power amplifiers in which controlled rectifiers vary the flow of electrical energy between an AC source and a drive motor. By controlled rectifiers is meant a family of devices which present a relatively high blocking impedance to the flow of electrical energy until these controlled rectifiers are forward biased and simultaneously have firing signals applied to a gate electrode. At this time, the controlled rectifiers provide a very low impedance to the flow of current and normally continue to conduct current until they are back biased and/or the level of the current flowing through them is decreased to below a minimum holding current level necessary to keep these controlled rectifiers conducting. Controlled rectifiers include semiconductor devices such as silicon controlled rectifiers and tube devices such as ignitrons and thyratrons.

The controlled rectifiers used in the type of motor control system described above can be seriously damaged and caused to fail if they are subjected to severe overcurrent condition. When such overcurrent conditions are imminent, the current flow through these controlled rectifiers is normally terminated as rapidly as possible to prevent damage. Thus the firing signals are immediately removed from these controlled rectifiers so that they stop conducting as soon as they are reverse biased, with the result that a motor being controlled is allowed to coast to a stop. In addition to responding to overcurrent condition, motor control systems often include "emergency stop" provisions whereby firing signals are immediately removed from the gate of the controlled rectifiers of power amplifiers to prevent further current flow through the controlled rectifiers, either in response to the command of an operator of the system who has observed an emergency condition or automatically in response to the occurrence of a fault.

However, it has been found that even when the current flow through the controlled rectifiers is terminated and the coasting mode of operation is entered into as rapidly as possible the failure of controlled rectifiers is not avoided. Experience has shown that entering the coasting mode of operation causes controlled rectifier failures most often in motor control systems which normally, repeatedly operate in the regenerative mode.

SUMMARY OF THE INVENTION

It is, therefore, an object of this invention to reduce the failure of controlled rectifiers in power amplifiers of a motor control system which normally, repeatedly operates in a regenerative mode as this system enters into a coasting mode of operation.

It is another object of this invention to prevent the failure of controlled rectifiers in the power amplifier of a regenerative motor control system as a result of eliminating the flow of current in these controlled rectifiers as rapidly as possible.

It is still another object of this invention to provide a protective circuit which reduces the frequency of failure of controlled rectifiers in power amplifiers of control systems when these systems are required to rapidly shutdown, say due to a failure within the control system itself or due to some other emergency condition.

Briefly stated, and in accordance with one aspect of this invention, a motor control system of the type described includes a power amplifier comprising a plurality of controlled rectifiers. The system further comprises a circuit for supplying firing signals to the power amplifier to control the firing of these controlled rectifiers. The system also includes sources of signals which indicate that due to an emergency situation, either within the drive or outside of the drive itself, the flow of current through the controlled rectifiers should be terminated as rapidly as possible. Upon the receipt of a signal from the last-named source, a protective circuit for the motor control system causes the firing signals for the controlled rectifiers to be provided at a retarded phase angle during each half cycle of the applied AC source voltage. As a result of providing these retarded firing signals, controlled rectifiers which would normally not be fired to terminate the flow of current through the power amplifier as rapidly as possible are fired at the retarded phase angle so as to aid in commutating the controlled rectifiers which are conducting when the emergency situation occurred. Lockout means are provided to prevent firing signals from being applied to the controlled rectifiers after the current has decreased below a predetermined level. The lockout means further include means to positively prevent the lockout means from becoming effective while the current flowing between the source and the motor is above this predetermined level.

DESCRIPTION OF THE PREFERRED EMBODIMENT

Figure 1:
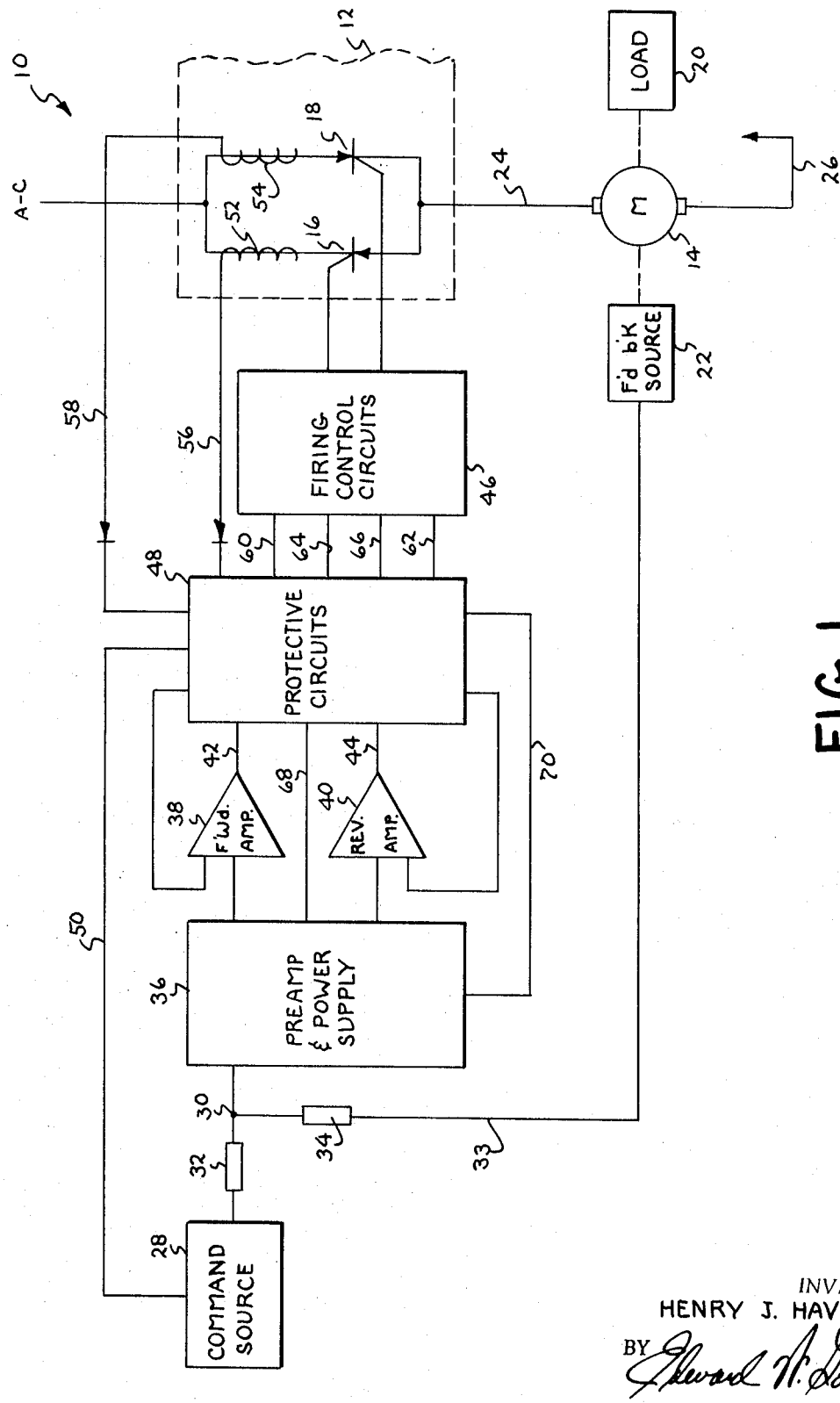
FIG. 1 is a block diagram of a emergency control system incorporating this invention.

In the block diagram of the motor control system of FIG. 1, an AC source 10 is connected to a bidirectional power amplifier 12 which includes controlled rectifiers for conducting current in both directions between the AC source 10 and a drive motor 14 of a regenerative motor control system. A controlled rectifier 16 represents the requisite quantity of controlled rectifiers to conduct current in a forward direction between the AC source 10 and the drive motor 14. A second controlled rectifier 18 represents the requisite quantity of controlled rectifiers to conduct current in the opposite or reverse direction between the AC source 10 and the drive motor 14. A second controlled rectifier 18 represents the requisite quantity of controlled rectifiers to conduct current in the opposite or reverse direction between the AC source 10 and the drive motor 14.

Each of the groups of controlled rectifiers 16 and 18 will be in a configuration which depends upon the number of power phases which are used to transfer power between the AC source 10 and the drive motor 14 and whether full wave or half wave rectified power is to be used. For example, where a three phase full wave rectified system is to be used, each of the rectifier groups 16 and 18 would comprise the well-known three phase full wave bridge circuit which uses six controlled rectifiers or a multiple thereof to conduct current between the AC source 10 and the drive motor 14. Where a single phase system is used, each of the controlled rectifier groups 16 and 18 may comprise four controlled rectifier circuits connected in the well-known single phase full wave rectifying bridge circuit.

The drive motor 14 includes not only the schematically shown armature portion but also includes appropriate field windings which are energized for establishing a desired level of flux for the motor. A load 20 and a feedback source 22 are shown to be mechanically coupled to the drive motor 14.

Rectifier power is conducted through the appropriate controlled rectifiers 16 and 18 of the power amplifier 12 and through conductors 24 and 26 to the drive motor 14 in response to direction command signals from a command source 28. The command source 28 may also include a provision for rendering such other commands as may be required for the desired control of the load, including a modulated command signal and an "Emergency Stop" signal.

Typically, the modulated signal is proportional to the desired performance of the drive 104 which, 14 with respect to a regulated parameter. In the speed regulated drive system shown in FIG. 1, the modulated signal is proportional to the desired motor speed and may be termed a speed the positive This speed signal is introduced into a summing junction 30 through a resistor 32. At the summing junction 30, the speed signal is compared with an opposite polarity speed feedback signal from the feedback source 22. The speed feedback signal has a magnitude which is proportional to the actual speed of the drive motor 14 speed and is fed back to the summing junction 30 through a lead 33 and a resistor 34. A net speed signal resulting from the comparison at the summing junction 30 is then processed in a preamp and power supply 36 by a differential amplifier. Following discrimination and amplification in the differential amplifier, further amplification is provided in either a forward amplifier 38 or a reverse amplifier 40, depending on the desired direction of rotation of the drive motor 14. Output signals from either forward lead 42 or reverse lead 44 govern a group of firing control circuits 46 which, in turn, deliver firing signals to appropriate controlled rectifiers of the power amplifier 12.

The protective circuits 48 of the motor control system respond to critical variables of the system to protect the controlled rectifier from failure when the system is required to enter into a coasting mode of operation. As explained previously in this patent application, the coasting mode of operation may be entered automatically where an internal fault condition of the motor control system is sensed, such as an overcurrent condition. An operator can cause the command source 28 to provide an emergency stop signal which is conveyed to the protective circuits 48 through a lead 50 when he determines that an emergency exists. The protective circuits 48 include means for automatically retarding the occurrence of firing signals for the conducting controlled rectifiers of the power amplifier 12 when the coasting mode of operation is required.

The motor control system of FIG. 1 includes current transformers 52 and 54 which are coupled to the controlled rectifiers 16 and 18, respectively, to measure the level of current which is being conducted by either of these controlled rectifier groups. A current feedback signal is conducted through either a feedback circuit 56 or a feedback circuit 58, depending whether the forward or reverse controlled rectifiers 16 or 18, respectively, are conducting current. The protective circuits 48 also include means for responding to the level of current being conducted by the controlled rectifiers 16 or 18 to positively prevent the firing signals from being eliminated by a lockout circuit until the current flow between the AC supply 10 and the motor 14 is below a preselected level.

Once the protective circuits have retarded the firing of the controlled rectifiers while allowing the current flow therethrough to decrease, the firing signals are extinguished or eliminated after the current flow decreases below a preselected level. At this point in the operation of the protective circuits 48, the firing signals are positively locked out so that once the motor coasts to a stop the drive system must be intentionally restarted before motor rotation can be initiated once again.

Figure 2:
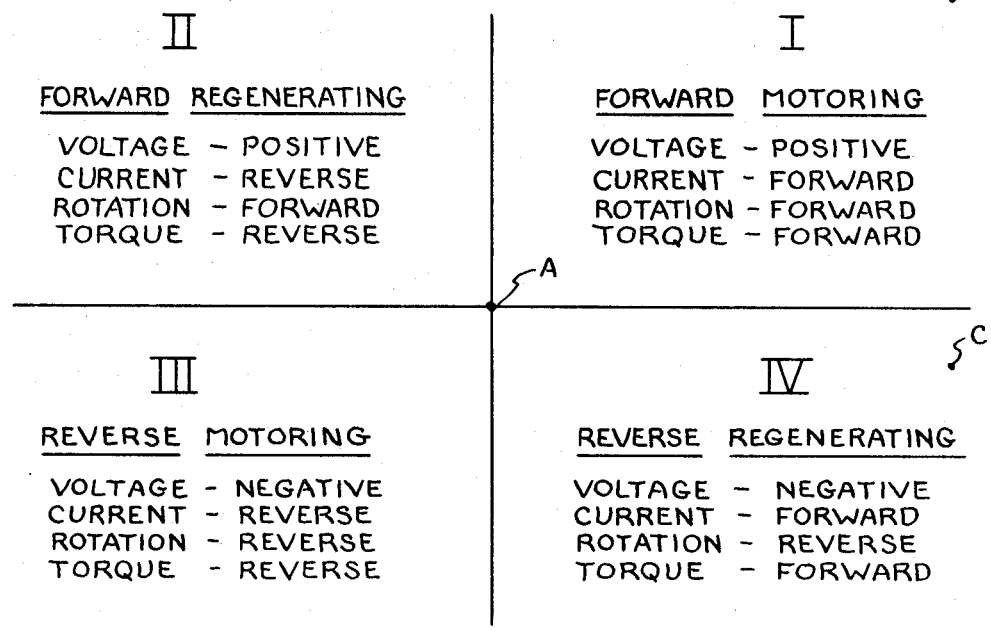
FIG. 2 depicts the direction and polarity relationships in motor operating modes in accordance with motor control terminology.

FIG. 2, which shows the conventional manner of depicting four quadrant motor operations, is now referred to for further explanation of the operation of the protective circuits 48. The ordinate or vertical axis of FIG. 2 represents motor voltage, while the abscissa or horizontal axis represents motor current. The type of motor operation which is being used for the purpose of explaining the preferred embodiment of this invention is the forward motoring mode of operation shown in quadrant I of FIG. 2 and the reverse regenerating mode of operation shown in quadrant IV. For both of these modes of operation, the current flows in the same direction between the AC source 10 and the motor 14, say, through the controlled rectifiers 16. Thus the motor always develops a forward torque while operating in quadrants I and IV, for example tending to lift the load of a crane hoist as it operates in quadrant I or retard the downward movement of the load of the hoist as it operates in quadrant IV.

During forward motoring operation, the motor voltage is referred to as positive in polarity and is applied to the motor armature 14 from the AC source 10 to cause the armature to rotate in a forward direction. During reverse regenerating the armature is caused to rotate in the reverse direction by a force outside of the motor control system, such as the weight of a load, so that the motor itself generates a voltage opposite in polarity from that which was present during forward motoring.

The motor itself is at standstill at point A of FIG. 2. With the application of positive voltage from the source 20 current flows in the forward direction, causing the motor to accelerate to its desired performance level at point B. Decreasing the voltage applied to the motor 14 causes the motor to decelerate so that its operating point begins to move in a downward direction toward Point C. When the operating point reaches the horizontal axis, the motor is at standstill and begins rotating in the opposite direction as the operation point is moved below the horizontal axis toward point C, the desired operating point during regeneration.

Assume that while operating at point C the motor control system of FIG. 1 is required to enter the coasting mode of operation as rapidly as possible to eliminate the flow of current through the controlled rectifiers 16. Prior to this invention one manner of automatically so doing was to immediately eliminate the firing signals from the gate electrodes of these controlled rectifiers. Thus, once the controlled rectifiers stopped conducting current they would not be fired again, and no further current would flow through them. However, the drive motor 14 is a highly inductive load which causes the motor current to lag behind the voltage at the armature of this motor. Because of this lagging current and the fact that the current can continue to flow through controlled rectifiers once they are turned on, the voltage at the AC source 10 is not effective to turn off the controlled rectifiers 16 even though a combination of the AC source voltage and the armature voltage tends to reverse bias these controlled rectifiers during at least a portion of the reverse regenerating mode of operation.

Normally, the subsequent sequential firing of other controlled rectifiers which were to be fired next in the operation of the motor control system would cause commutation of the conducting controlled rectifiers to take place while the controlled rectifiers were reverse biased. Since the generation of firing signals was terminated, the other controlled rectifiers of the group 16 were not fired and the conducting controlled rectifiers continued to carry current during the period of time when they tend to be reverse biased and until the time when they were forward biased once again. Thus an uncontrolled surge of current from the AC source 10 may be added to the regenerative current of the motor, causing an overcurrent condition to exist in the conducting controlled rectifiers which may destroy them.

Figure 3:
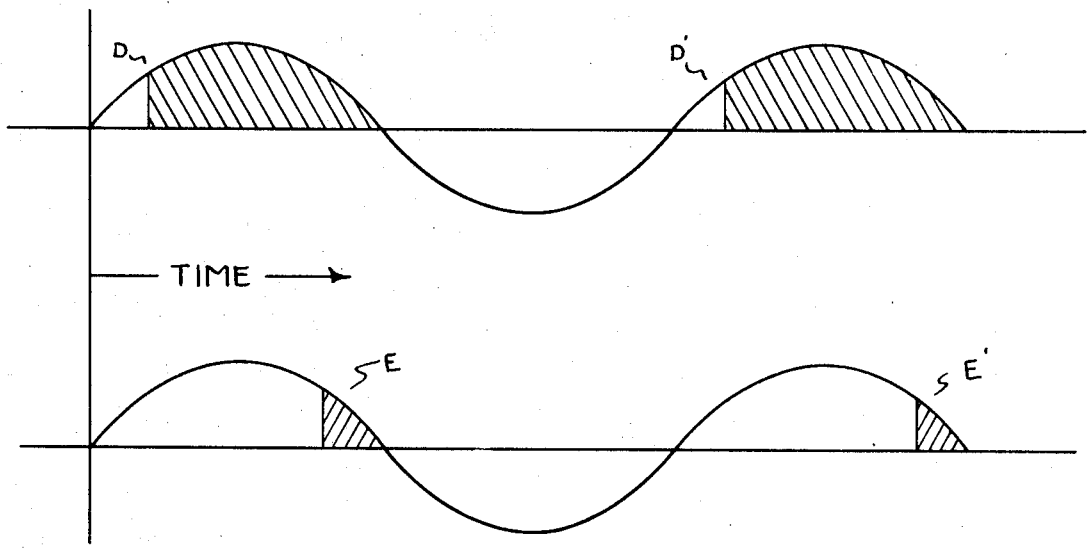
FIG. 3 shows graphically the relationships of controlled rectifier firing angles.

It has been found that when firing of the controlled rectifiers is reduced from their normal advanced firing points, shown for example at points D and D' of FIG. 3, not to the more common retarded firing points, shown for example at points E and E' of FIG. 3, but to retarded phase angles occurring after the biasing voltage crosses the zero axis and the retarded firing angles are retained until the current flowing through the controlled rectifiers is below a preselected level at which the inductive motor load is no longer a problem, the failure of controlled rectifiers in an emergency stop situation is reduced. The actual retarded phase angle found to be advantageous in one application of this invention was about 30° after the voltage on the controlled rectifier crossed the zero axis. This phase angle was retained for both motoring and regeneration to simplify control circuits, even though it was not needed and was ineffective during the motoring mode of operation.

Figure 4:
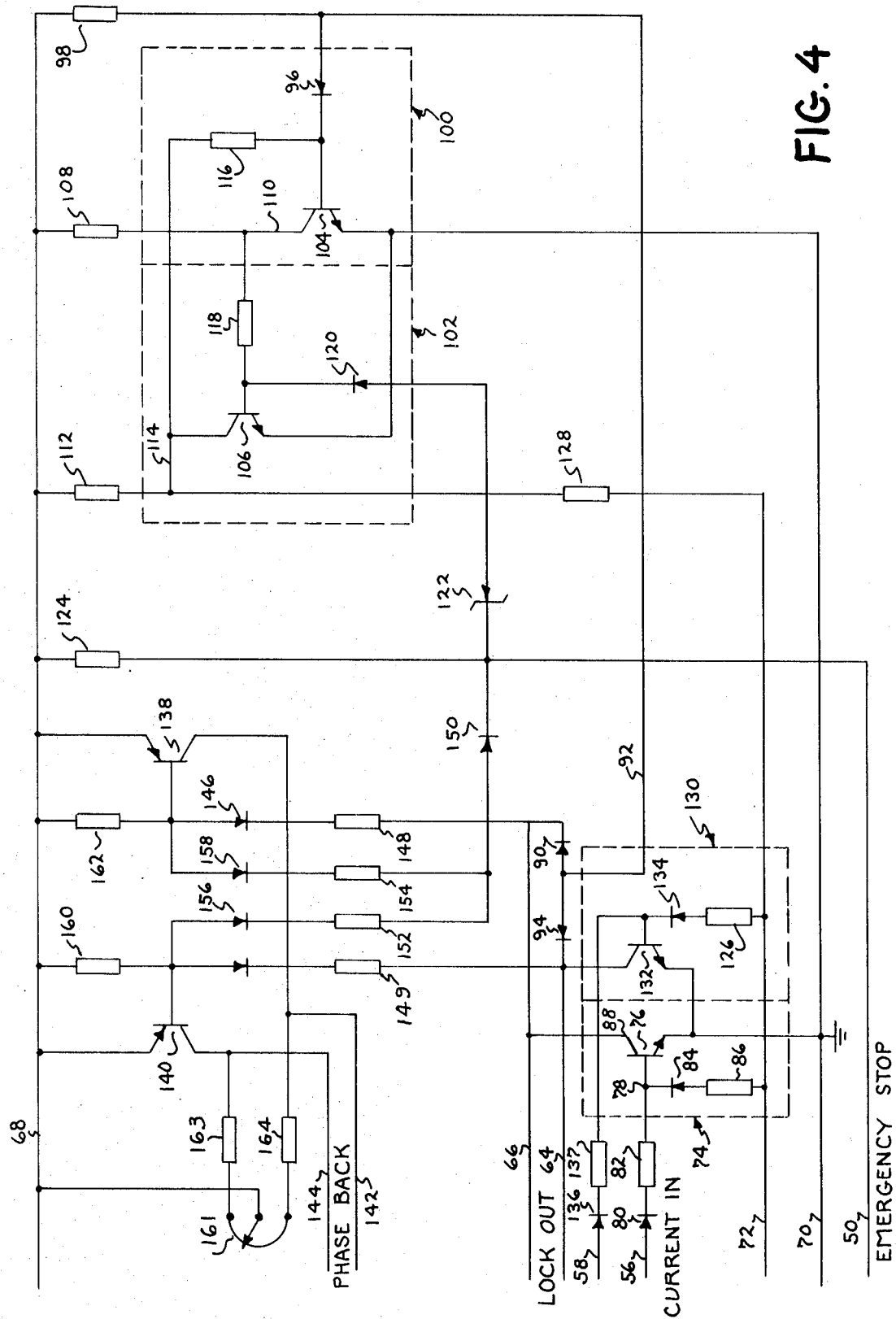
FIG. 4 is a schematic diagram detailing a control system incorporating a preferred embodiment of this invention.

FIG. 4 is a schematic diagram showing the preferred embodiment of the current limit and overcurrent protective circuits 48. A forward current responsive switch 74 comprises a transistor 76 which receives a current input signal from lead 56 to turn on the switch 74 when current flows through the forward controlled rectifiers 16 as the motor control system operates in quadrants I and IV of FIG. 2. The current signal is conducted through a diode 80 and a resistor 82 to a base connection 78 of the transistor 76. The transistor 76 further includes a second input circuit including a diode 84 having its cathode connected to the base 78 and its anode connected through a resistor 86 to a bus 72.

The protective circuit 48 further includes a reverse current responsive switch 130 having a transistor 132 which is turned on when a signal at the lead 58 indicates that current is flowing through the reverse controlled rectifiers 18. Signals from the lead 58 are coupled through a diode 136 and a resistor 137 to the base electrode of the transistor 132.

A collector lead 88 of the transistor 76 is connected to the reverse rectifier firing signal lockout lead 66 so that when the transistor 76 conducts the reverse lockout lead 66 is grounded, and firing signals are prevented from being applied to the reverse controlled rectifiers 18. Similarly, the collector electrode of the transistor 132 is connected to the forward rectifier firing signal lockout lead 64. When the transistor 132 conducts this forward lockout lead 64 is grounded, and firing signals are prevented from being applied to the forward controlled rectifiers 16. The reverse lockout lead 66 is connected to the cathode of the blocking diode 90. The cathode of blocking diode 94 is connected to the forward lockout lead 64. The anodes of these diodes are connected through a lead 92 to the anode of a blocking diode 96 and through a resistor 98 to the positive bus 68.

The diode 96 is included in a base circuit of a transistor 104 which, along with a transistor 106, is arranged in a modified, cross-coupled circuit comprising switches 100 and 102, respectively. A collector lead 110 of the transistor 104 is connected through a resistor 108 to the positive bus 68, while a collector lead 114 of the transistor 106 is connected through a resistor 112 to the bus 68. A 116 couples The base of the transistor 104 to the collector of the transistor 106, while a resistor 118 couples the base of the transistor 106 to the collector of the transistor 104.

A resistor 128 connects the collector lead 114 of the transistor 106 through the bus 72 to the base circuits of the transistors 76 and 132 of the forward current responsive switch 74 and the reverse current responsive switch 130, respectively. While the transistor 106 is conducting a relatively low potential at the collector electrode 114 is ineffective in biasing the transistors 76 and 132. However, when the transistor 104 is turned on and the transistor 106 is no longer conducting, the high potential at the collector 114 turns on both the switch 74 and the switch 130 through the base circuits of the transistors 76 and 132.

By connecting the lead 50 to the common bus 70, the emergency stop signal can be conducted through the lead 50 to a junction between a zener diode 122 and a diode 150 to control the application of the retarded firing angles to the conducting controlled rectifiers. This junction is connected through a resistor 124 to the positive bus 68 to provide the normal bias for the lead 50. The normal positive bias of the emergency stop lead 50 is coupled through the zener diode or breakdown device 122 and through a diode 120 to the base circuit of the transistor 106. The lead 50 itself is connected through diode 150 to a resistor 154 and a diode 158 to the base circuit of a transistor 138 and to a resistor 152 and a diode 156 to the base circuit of a transistor 140. The transistors 138 and 140 control the potential at phase back leads 142 and 144, with the collector of the transistor 138 connected to the reverse phase back lead 142 and the collector electrode of the transistor 140 connected to the forward phase back lead 144. A high potential at the lead 142 causes the firing of the controlled rectifiers 18 to be retarded by affecting the output level of the reverse amplifier 40 of FIG. 1. A high potential at the lead 144 causes the firing of the controlled rectifiers 16 to be retarded by affecting the output level of the forward amplifier 38 of FIG. 1.

The collector of the transistor 138 is biased through a resistor 164 and a voltage divider 161 having its slide wire connected to the positive bus 68. The transistor 140 is similarly biased by the resistor 163 and the other side of the voltage divider 161. A resistor 162 is connected between the base electrode of the transistor 138 and the positive bus 68, while a resistor 160 is connected between the base of the transistor 140 and this bus.

The transistors 138 and 140 can both be turned on by a low potential emergency stop signal caused by connecting the emergency stop lead 50 to the common bus 70, this signal forward biasing the diode 150 and the diodes 156 and 158 in the base circuits of these transistors. The base circuit of the transistor 138 is also biased through a diode 146 and a resistor 148 connected to the reverse lockout lead 66. Similarly, the transistor 140 is biased through a diode 147 and a resistor 149 connected to the forward lockout lead 64. When current is flowing through the controlled rectifiers 16 in FIG. 1 to produce forward torque, thereby turning on the transistor 76 of the switch 74, the transistor 138 conducts to apply a high potential at the reverse phase back lead 142. This operation preconditions the reverse amplifier 40 for the next time it conducts current. Similarly, a current flow through the reverse controlled rectifier 18, producing a reverse torque and causing the transistor 132 of the switch 130 to conduct turns on the transistor 140 to apply a high potential at the forward phase back lead 144, preconditioning the amplifier 38.

OPERATION OF FIG. 4

Assume that the motor control system of FIG. 1 is operating in the reverse regenerating mode, shown in the quadrant IV of FIG. 2. At this time, current is flowing through the controlled rectifiers 16 to produce a forward torque while the motor is rotating in a reverse direction, say due to the gravitational force on a load of a crane hoist or for a similar reason. A signal on lead 56 indicates the direction of current flow and causes the transistor 76 to be turned on. The reverse lockout lead 66 is shorted to the common lead 70 so that firing signals are prevented from being coupled to the controlled rectifiers 18 of FIG. 1. As a result these controlled rectifiers 18 cannot inadvertently be turned on. Furthermore, the conducting transistor 76 of the switch 74 turns on the transistor 138 through the resistor 148 and the diode 146 to raise the potential at the reverse phase back lead 142. The purpose of this feature is to set the level at which firing signals would first be applied to the controlled rectifiers 18 at the retarded phase angle, about 30° after the AC since wave crosses the zero axis in one example.

With the transistor 76 connecting the reverse lockout lead 66 to the common 70, the diode 90 is forward biased so that current flows through the resistor 98 to drop the potential at the base electrode of the transistor 104 to turn off this transistor.

During the normal operation of FIG. 1, the potential at the emergency stop lead 50 is positive in polarity and above the breakdown level of the zener diode 122. Thus the transistor 106 is turned on, lowering the potential at its collector 114 to prevent it from turning on the transistor 132 of the switch 130. The positive potential at the cathode of the diode 150 and the nonconducting transistor 132 prevent the transistor 140 from conducting so that the forward phase back lead 144 is at its lower potential level. Thus the controlled rectifiers 16 of FIG. 1 can fire at any phase angle normally required by the motor control system.

Upon the occurrence of an emergency stop condition the emergency stop lead 50 is shorted to the common lead 70 so that the diode 150 is forward biased. The previously nonconducting transistor 140 is turned on through the resistor 152 and the diode 156. The transistor 138 stays turned on through the biasing action of the resistor 154 and the diode 158. As a result, the lead 144 is raised to its higher potential and the firing of the controlled rectifiers 16 is retarded in accordance with this invention. As stated above, a preferable retarded phase angle for one application of this invention was about 30° retarded from the point where the source voltage crossed the zero axis, the controlled rectifiers being still forward biased due to armature voltage polarity during regeneration. The current flow through the controlled rectifiers 16 begins to decrease rapidly as a result.

The zener diode 122 is no longer conducting since the emergency stop lead 50 is at the potential of the common bus 70. However, current is still flowing through the controlled rectifiers 16 of FIG. 1 at such a level as to cause the transistor 76 to remain turned on, although the level of this current is continuously decreasing. The reverse lockout lead 66 is still at its low potential, and thus current still flows through the diode 90 and the resistor 98 to keep the transistor 104 turned off and the transistor 106 turned on due to the effect of the resistor 118 in the cross-coupled circuit. With firing signals for the controlled rectifiers 18 of FIG. 1 locked out and with the transistor 106 forcefully held on, the transistor 132 of the switch 130 cannot be turned on and thus firing signals for the controlled rectifiers 16 of FIG. 1 cannot be locked out at this time.

When the current flowing through the controlled rectifiers 16 of FIG. 1 drops below a predetermined level, the feedback signal at the lead 56 can no longer keep the transistor 76 in the switch 74 in its conducting state. The potential at the collector electrode 88 of this transistor rises at this time so that the diode 90 is reverse biased. Current stops flowing through the resistor 98, and thus the diode 96 of the switch 100 is forward biased by the potential at the bus 68 so that the transistor 104 of the cross-coupled circuit is turned on. As a result, the transistor 106 of the cross-coupled circuit is turned off, raising the potential level at its collector 114. The predetermined current level should be as low as possible, taking into consideration the accuracy of the current transformers 52 and 54 of FIG. 1 and the effects of transients in the power amplifier 12 around the zero current level.

At this point in the operation of the protective circuit of FIG. 4 both of the transistors 76 and 132 are turned on by the positive potential at the collector 114. These transistors begin to conduct heavily so that both the forward lockout lead 64 and the reverse lockout leak 66 are at the common potential of the bus 70. No further firing signals can be coupled to either the controlled rectifiers 16 or the controlled rectifiers 18 of FIG. 1. The firing signals remain locked out until some further positive action is taken, say by an operator of the motor control system, to correct the condition which required the emergency stop action.

The operation of this invention during regeneration with motor rotation in the forward direction is similar to the above, except that current flows through the controlled rectifiers 18 of FIG. 1 and is sensed at the lead 58 of FIG. 4 to normally hold on the transistor 132. While the same sequence of events occurs during motoring, the controlled rectifiers 16 are reverse biased at the time the retarded firing signals are applied and the controlled rectifiers are not fired.

This invention is not limited to the particular details of the preferred embodiment illustrated. It is contemplated that many variations, modifications and applications will occur to those skilled in motor control systems art. It is, therefore, intended that the appended claims cover these variations, modifications and applications which do not depart from the true spirit and scope of this invention.

I claim:

1. A motor control system comprising, in combination:
   a. DC drive motor means;
   b. regenerative power amplifier means comprising controlled rectifiers connected to said motor means for controlling the flow of electrical energy between an AC source and said motor means;
   c. circuit means connected to said power amplifier for supplying firing signals to control the firing of said controlled rectifiers; said means including a regulator comprising a command source for providing reference signals which vary as a function of the desired performance of said motor means, feedback means, including a current feedback circuit, for providing feedback signals which vary as a function of the actual performance of said motor means, and means responsive to the difference between reference signals and feedback signals to control the phase angle of the AC source voltage applied to said controlled rectifiers at which firing signals are supplied to each of said controlled rectifiers;
   d. signal means for providing emergency stop signals to said regulator to indicate that current flow through said controlled rectifiers should be terminated as rapidly as possible;
   e. means coupled to said signal means to cause the firing signals to fire said controlled rectifiers at a retarded phase angle during each half cycle of the applied AC source voltage upon the occurrence of an emergency stop signal;
   f. lockout means connected to said current feedback means for preventing firing signals from being applied to said controlled rectifiers in succeeding half cycles of the source voltage after the current has decreased below a predetermined level; and
   g. said lockout means including means for preventing said lockout means from becoming effective while the current flowing between the source and said motor means is above the predetermined level.

2. A motor control system in accordance with claim 1 including a first group of controlled rectifiers for conducting current in a forward direction and a second group of controlled rectifiers for conducting current in a reverse direction and said lockout circuit includes means for preventing firing signals from being applied to the controlled rectifiers of one of said groups while current is flowing in the controlled rectifiers of the other of said groups.

3. A motor control system in accordance with claim 1 wherein the retarded phase angle is about 30° after the source voltage crosses the zero voltage axis.

4. A motor control system comprising, in combination:
   a. DC drive motor means;
   b. regenerative power amplifier means comprising controlled rectifiers connected to said motor means for controlling the flow of electrical energy between an AC source and said motor means; said power amplifier including a first group of controlled rectifiers for conducting current in a forward direction and a second group of controlled rectifiers for conducting current in a reverse direction;
   c. circuit means connected to said power amplifier for supplying firing signals to control the firing of said controlled rectifiers; said means including a regulator comprising a command source for providing reference signals which vary as a function of the desired performance of said motor means, feedback means, including a current feedback circuit, for providing feedback signals which vary as a function of the actual performance of said motor means, and means responsive to the difference between reference signals and feedback signals to control the phase angle of the AC source voltage applied to said controlled rectifiers at which firing signals are supplied to each of said controlled rectifiers;

d. signal means for providing emergency stop signals to said regulator to indicate that current flow through said controlled rectifiers should be terminated as rapidly as possible;
e. means coupled to said signal means to cause the firing signals to fire said controlled rectifiers at a retarded phase angle during each half cycle of the applied AC source voltage upon the occurrence of an emergency stop signal;
f. lockout means connected to said current feedback means for preventing firing signals from being applied to said controlled rectifiers in succeeding half cycles of the source voltage after the current has decreased below a predetermined level; and
g. said lockout means including a cross-coupled amplifier circuit for preventing said lockout means from becoming effective while the current flowing between the source and said motor means is above the predetermined level.

5. A motor control system in accordance with claim 4 wherein the retarded phase angle is about 30° after the source voltage crosses the zero voltage axis.

6. A motor control system comprising, in combination:
a. DC drive motor means;
b. regenerative power amplifier means comprising controlled rectifiers connected to said motor means for controlling the flow of electrical energy between an AC source and said motor means;
c. circuit means connected to said power amplifier for supplying firing signals to control the firing of said controlled rectifiers; said means including a regulator comprising a command source for providing reference signals which vary as a function of the desired performance of said motor means, feedback means, including a current feedback circuit, for providing feedback signals which vary as a function of the actual performance of said motor means, and means responsive to the difference between reference signals and feedback signals to control the phase angle of the AC source voltage applied to said controlled rectifiers at which firing signals are supplied to each of said controlled rectifiers;
d. signal means for providing emergency stop signals to said regulator to indicate that current flow through said controlled rectifiers should be terminated as rapidly as possible;
e. means coupled to said signal means to cause the firing signals to fire said controlled rectifiers at a retarded phase angle of about 30° after the source voltage crosses the zero voltage axis during each half cycle of the applied AC source voltage upon the occurrence of an emergency stop signal;
f. lockout means connected to said current feedback means for preventing firing signals from being applied to said controlled rectifiers in succeeding half cycles of the source voltage after the current has decreased below a predetermined level; and
g. said lockout means also including a cross-coupled circuit for preventing said lockout means from becoming effective while the current flowing between the source and said motor means is above the predetermined level.